United States Patent [19]

Furchtgott et al.

[11] Patent Number: 4,727,538
[45] Date of Patent: Feb. 23, 1988

[54] INFORMATION TRANSFER METHOD AND ARRANGEMENT

[75] Inventors: David G. Furchtgott, Oak Park; Thomas L. Hiller, Glen Ellyn; Frederick H. Keeve, Jr., Bolingbrook, all of Ill.

[73] Assignee: American Telephone and Telegraph Company, AT&T Bell Laboratories, Murray Hill, N.J.

[21] Appl. No.: 865,269

[22] Filed: May 20, 1986

[51] Int. Cl.$^4$ ................................................. H04J 3/26
[52] U.S. Cl. ..................................... 370/85; 340/825.5
[58] Field of Search .................... 370/85, 86, 89, 95; 340/825.06, 825.07, 825.52, 825.5, 825.51

[56] References Cited

U.S. PATENT DOCUMENTS 4,441,162  4/1984  Lillie ..................................... 370/85
4,654,654  3/1987  Butler et al. ........................... 370/85

OTHER PUBLICATIONS

Leventhal—Microcomputer Experimentation w/the Intel. SDK-85, 1980, p. 88.

Intel's *Lan Components User's Manual*, Mar., 1984, Chapters 1 and 2, pp. 1-1 to 1-13; 2-1 to 2-63.

Primary Examiner—Douglas W. Olms
Assistant Examiner—James E. Busch
Attorney, Agent, or Firm—Kenneth H. Samples

[57] ABSTRACT

A local area network comprising a plurality of terminals interconnected by a communication bus is disclosed. Each terminal comprises a memory, a main processor, and a co-processor. To transmit information in a communication mode, the main processor loads data into a transmit buffer area of the memory, and the co-processor reads the data from the transmit buffer area and transmits a packet on the communication bus. Similarly, the co-processor receives data from the communication bus and stores it in a receive buffer area from which it is read by the main processor for use. In an alternative mode, called the direct transfer mode, the co-processors are reconfigured so that data for transmission is read from the actual locations in memory where it is stored (not the transmit buffer area), and received data is stored in storage areas where it is expected to be used (not the receive buffer area).

10 Claims, 6 Drawing Figures

INFORMATION TRANSFER METHOD AND ARRANGEMENT

TECHNICAL FIELD

This invention relates to data communication systems, and more particularly to improved methods and arrangements for conveying data in such systems.

BACKGROUND OF THE INVENTION

In one known type of data communication system, a plurality of access terminals is connected to a common data bus for the exchange of information using data packets or frames. Such systems commonly have an interface unit connected between the data bus and the terminals and the interface actually accumulates (transmits) the frames for the terminal associated therewith. Such a system is sometimes referred to as a Local Area Network or LAN. The interface unit includes a memory having a receive buffer area and a transmit buffer area for storing frames after reception or before transmission. The receive and transmit buffer areas are actually a number of small buffer areas which can be linked together depending on the length of the frame to be treated. When information is to be transmitted from a terminal, a control unit in that terminal loads information into the transmit buffers and notifies the interface unit to transmit the information on the data bus. Similarly, after a frame is received, the interface unit notifies the control unit which unloads the designated receive buffers and moves the information to an area of memory for use by the terminal or for further transmission. Providing small linked buffers yields very efficient memory usage when the individual frames are small. However, each frame transmitted or received, requires substantial control unit time to load and unload the buffers. Thus, if large amounts of information must be moved in small frames, the control unit is severely burdened. We propose a method and arrangement whereby large amounts of information can be conveyed in a local area network, in which large frames are transmitted and a minimum of control unit time is required.

SUMMARY OF THE INVENTION

The aforementioned problem is solved and a technical advance is achieved in accordance with the principles of the present invention. In an arrangement comprising a first control unit for transmitting frames of data connected by a bus to a terminal comprising a second control unit, a co-processor, and a memory comprising a receive buffer area and a data and control area wherein the co-processor is set to receive frames of data from the bus and to store the frames of data so received in the receive buffer area, and the second control unit reads received data from the receive buffer area for use by the second control unit, the method comprising setting the co-processor to store received frames of data in particular memory locations in the data and control area of the memory which particular locations are the actual locations where the data is to be stored; transmitting by the first control unit a frame of data to the terminal; storing by the co-processor the frame of data in the particular memory locations; and resetting the co-processor to store subsequent frames of data in the receive buffer area of that memory. Additionally, in an arrangement comprising a first terminal for transmitting data frames on a bus which first terminal comprises a control unit, a co-processor, and a memory comprising a transmit buffer area and a data and control area wherein the control unit initiates the transmission of a data frame by loading data into the transmit buffer area and setting the co-processor to transmit on the bus a data frame including the data loaded into the transmit buffer area, the method comprising determining the actual locations in the data and control area storing data to be transmitted on the bus; setting the co-processor to transmit on the bus a data frame including the data in the actual locations in the data and control area; transmitting by the co-processor a data frame comprising the data in the actual locations of the data and control area; and resetting the co-processor to transmit data frames including data from the transmit buffer area.

In accordance with one embodiment of the present invention, a plurality of terminals is interconnected by a communication bus. In the communication mode, which is the normal mode for the exchange of data frames, a central processing unit in a sending terminal loads data to be transmitted into a previously-defined transmit buffer area of a memory in the sending terminal. A local area network co-processor reads the transmit buffer area and transmits a frame of data on the bus including the information read from the buffer. A receive terminal, in the communication mode, receives data frames from the bus and stores the received frames in a receive buffer area of a memory. A central processing unit in the receive terminal then reads the receive buffer area and moves the data to other locations for use or retransmission. The embodiment also operates in a direct transfer mode where data is transmitted directly from memory locations which are not in the transmit buffer area and data, upon being received, is stored directly into memory locations which are not in the receive buffer area. To enter the direct transmission mode, information controlling the co-processor in the sending terminal is modified so that the data for a transmitted frame is read from the actual memory locations storing the data. This eliminates the movement of the data to the transmit buffer area by the central processing unit. Additionally, information controlling the receiving terminal is modified so that the received data is written directly into memory locations where the data is to be used (not the receive buffer area). This eliminates the movement of received data from the received buffer areas by the receiving central processing unit. Upon completion of the direct transfer, both terminals are reconfigured so that communication mode operations can continue.

BRIEF DESCRIPTION OF THE DRAWING

A more complete understanding of the present invention may be obtained from a consideration of the following description when read in conjunction with the drawing in which.

DETAILED DESCRIPTION

Figure 2:
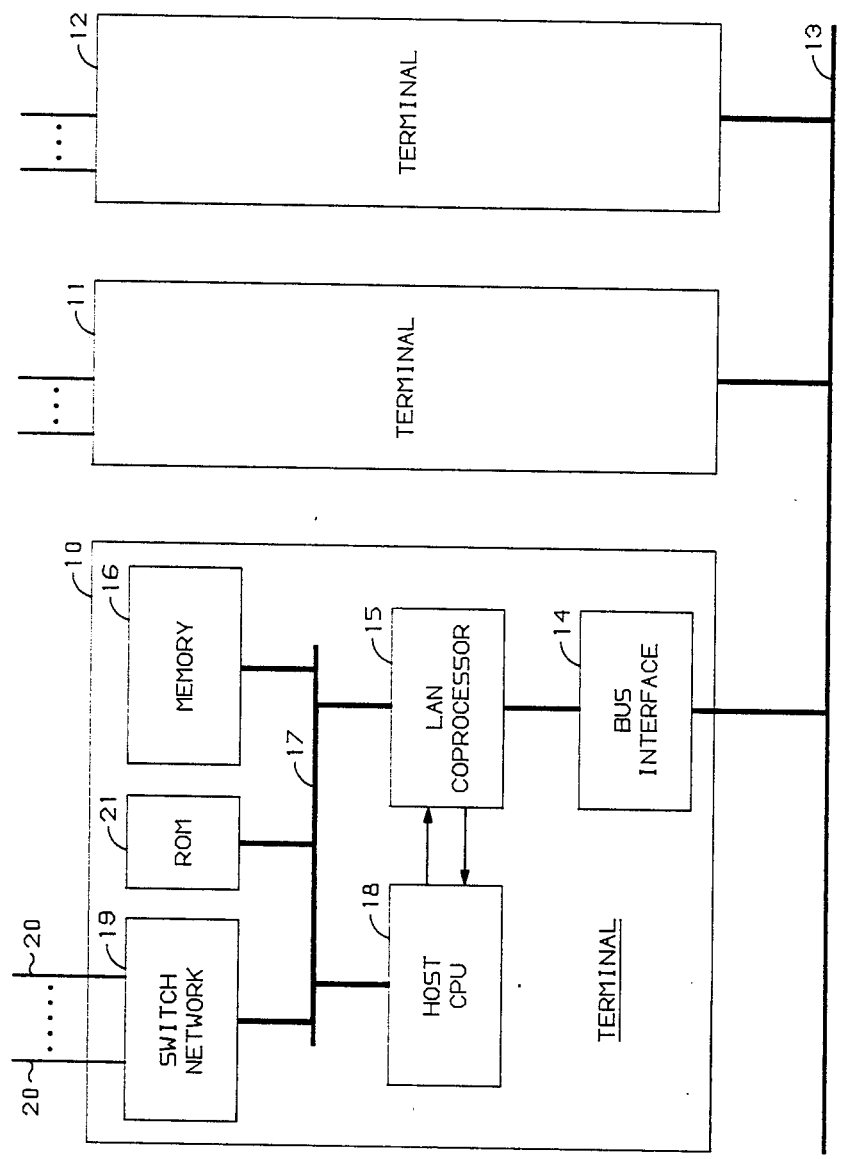
FIG. 2 is a diagram of a network of terminals.

FIG. 2 is a block diagram of a Local Area Network (LAN). This LAN includes terminals 10, 11, and 12, which are all connected to a data bus 13. Each terminal has an address and is capable of exchanging frames of data with the other terminals via data bus 13. A frame of data includes a header portion defining the source and destination of the frame and a type field. The frame also includes a data portion, which is the actual information conveyed by the frame. The type field defines the type of the associated frame, e.g., data or control information. Each terminal, e.g., 10, comprises a bus interface 14, which connects a LAN co-processor 15 to the data bus 13. The LAN co-processor 15 continuously analyzes the information on data bus 13 via the bus interface 14. When the destination address in a frame on data bus 13 is the address of a given terminal, e.g., 10, the co-processor 15 of that given terminal receives the frame and stores it in a buffer area of memory 16 via a bus arrangement 17. Upon successful reception and storage of a frame, a host central processing unit (CPU) 18 is notified. The host CPU 18 can then use the information portion of the received frame by removing that information from the buffer area of memory 16. Each terminal, e.g., 10, also includes a read only memory 21, which stores a relatively small set of instructions and data. The stored instructions and data are used to initialize the terminal. ROM 21 also stores certain predetermined constants such as predetermined addresses, the use of which is discussed later herein.

In the present example, CPU 18 is the main processor of terminal 10 and is used to control a switch network 19 to connect communication lines 20 with the co-processor 15 so that these communication lines can communicate on data bus 13. When host CPU 18 desires to transmit on data bus 13, that CPU stores a frame of data in the buffer area of memory 16. As discussed in more detail later herein, the LAN co-processor 15 transmits the stored frame on bus 13 when that bus is determined to be idle. In the present example, LAN co-processor 15 may be the Intel 82586, the use of which is discussed in detail in the *LAN Component Users Manual*, published by the Intel Corporation in 1984.

Figure 3:
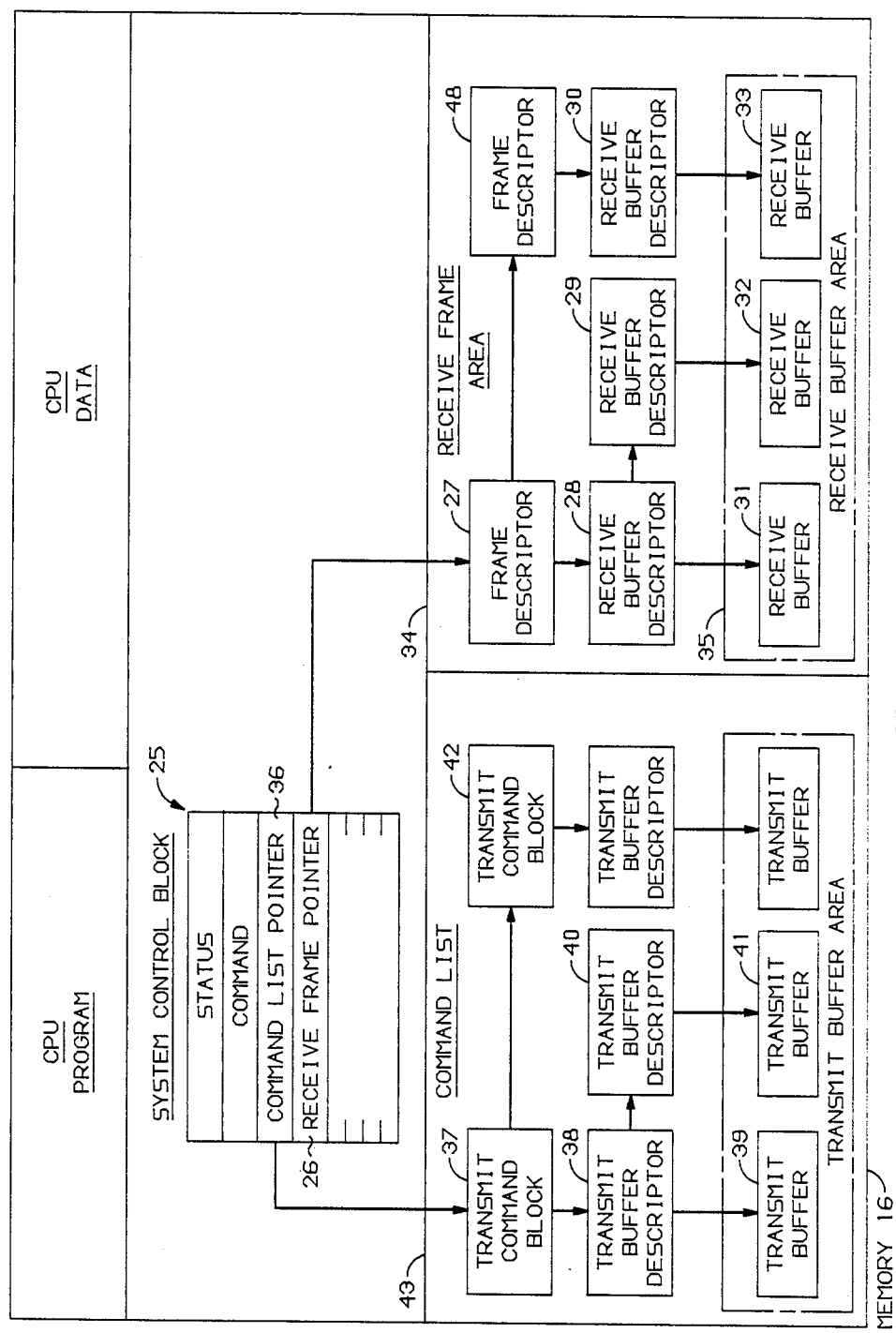
FIG. 3 is a representation of memory usage in the communication mode.

FIG. 3 is a more detailed representation of the utilization of memory 16. Substantially all of the program and data for use by the CPU 18 is stored in memory 16 along with certain control information and the data buffers used by the LAN co-processor 15. When a terminal, e.g., 10, is initialized, CPU 18 creates a system control block 25 at a predetermined location of memory 16 in an area of memory used for controlling the storage and transmission of frames of data. The predetermined location is determined from data stored in ROM 21 (FIG. 2). System control block 25 includes a receive frame pointer 26 which points to a linked list of frame descriptors. This linked list is represented in FIG. 3 by frame descriptors 27 and 48. The actual number of frame descriptors created limits the number of frames which can be concurrently stored in the system and is selected based on expected traffic conditions. In the present example, 100 frame descriptors are created at initialization. Also created at initialization is a plurality of receive buffer descriptors 28 through 30 and a plurality of receive buffers 31 through 33. Each receive buffer descriptor 28 through 30 is linked by information stored in that receive buffer descriptor to a respective receive buffer 31 through 33 when it is created. Also, each receive buffer descriptor stores a value defining the size, in bytes, of the receive buffer linked thereto. In the present example, 100 receive buffer descriptors and accordingly 100 receive buffers are created at initialization and each receive buffer is capable of storing 64 bytes of data. The combination of frame descriptors, receive buffer descriptors, and receive buffers is referred to herein as the receive frame area 34, while the memory locations occupied by the receive buffers 31 through 33 is collectively referred to as the receive buffer area 35.

The following is a discussion of the use of frame descriptors, receive buffer descriptors, and receive buffers when a frame is received. The discussed mode of operation is called the communication mode which is the normal mode for transmitting and receiving data on bus 13. As previously stated, LAN co-processor 15 surveys the information on data bus 13 until a frame having the address of that LAN co-processor 15 is detected. Co-processor 15 then selects an idle frame descriptor, e.g., 27, and stores therein the header information from the received frame. Additionally, co-processor 15 assigns a receive buffer descriptor, e.g., 28, and accesses the receive buffer descriptor 28, to determine the location and size of the associated receive buffer 31. The data from the received frame is then stored in the associated receive buffer 31, and upon complete reception, a value representing the actual number of bytes of data stored in the receive buffer 31 is stored in receive buffer descriptor 28. When the data portion of a received frame is too large for a single receive buffer, e.g., 31, the LAN co-processor 15 links as many receive buffer descriptors together as necessary to provide sufficient capacity for the received data. This is shown by the link between receive buffer descriptors 28 and 29 in FIG. 3. After storing a complete frame, co-processor 15 notifies CPU 18 which responds thereto by accessing the information from the receive buffers for its use or for further transmission on communication lines 20 (FIG. 2).

The following is a discussion of the transmission of frames on bus 13 while in the communication mode. A command list pointer 36 is also stored in the system control block 25 at the time of initialization. The command list pointer 36 points to a location in memory called a command block, several of which may be linked together. The link structure of command blocks is represented in FIG. 3 by transmit command blocks 37 and 42. The command blocks define actions to be undertaken by the LAN co-processor 15. Only one type of command, the transmit command, is discussed in detail herein for ease of understanding. When CPU 18 wishes to transmit a frame, it creates a transmit control block, e.g., 37 at the location pointed to by the command list pointer 36 of system control block 25. The transmit command block 37 points to a transmit buffer descriptor 38, which in turn points to a transmit buffer 39. The transmit command block 37 stores a transmit command, the destination for the frame, and the type of frame to be sent. CPU 18 also stores in the transmit buffer descriptor 38, a byte count value which identifies the size of the associated transmit buffer and a value indicating, the actual number of bytes in transmit buffer 39 which contain data for the frame. When a frame to be transmitted has more data than can be stored in a single transmit buffer, multiple transmit buffer descriptors can be linked together. This is shown by the link between transmit buffer descriptor 38 and transmit buffer descriptor 40 in FIG. 3. The actual data to be transmitted is stored in the transmit buffers, e.g., 39 and 41 by the CPU 18. Co-processor 15 periodically reads information stored by the CPU 18 in the system control block 25 to determine whether the CPU has scheduled any tasks to be performed. When the system control block 25 information indicates that a task has been scheduled, co-processor 15 accesses the first transmit command block 37. Since this command block includes a transmit command, co-processor 15 formulates a frame from the information in the transmit command block 37, the linked transmit buffer descriptors 38 and 40, and the transmit buffers 39 and 41. Co-processor 15 then transmits the frame when the data bus 13 is available. A transmit command block is associated with only one frame of data at a time. When multiple frames are to be transmitted, multiple transmit command blocks can be linked together as shown by the pointers between transmit command block 37 and transmit command block 42 in FIG. 3. The combination of command blocks transmit buffer descriptors and transmit buffers is referred to as the command list 43 while the memory locations occupied by the transmit buffers, e.g., 39 and 41, are collectively referred to as the transmit buffer area.

From time to time, it may be desirable to transmit a large part or the entire contents of memory 16 of one terminal to another terminal. For example, when a portion (or all) of the contents of memory 16 in one terminal is found to be erroneous, it would be desirable to provide the new memory contents from a substantially identical terminal. Also, it may be desirable to copy the entire contents or a significant portion thereof from a first terminal into a second terminal so that the second terminal can be used as a substitute for the first. The communication mode operation discussed above may be entirely ineffective in a large information transfer due to the time required for CPU 18 control at both the source and destination terminals. Accordingly, a new mode of operation, called the direct transfer mode, is used when large amounts of data need to be exchanged. In the present embodiment, only one terminal, e.g., 11, is permitted to enable itself or other terminals to initiate a change to the direct transfer mode. This is done to reduce the probability that an errant terminal will improperly overwrite data or program in the other terminals. It should be noted that all of the program and data of memory 16 can be updated using the direct transfer mode. However, the following example relates to the transmission of a 32K byte block of data from memory 16 of terminal 12 (the sending terminal) to the memory 16 of terminal 10 (the receiving terminal).

Figure 1:
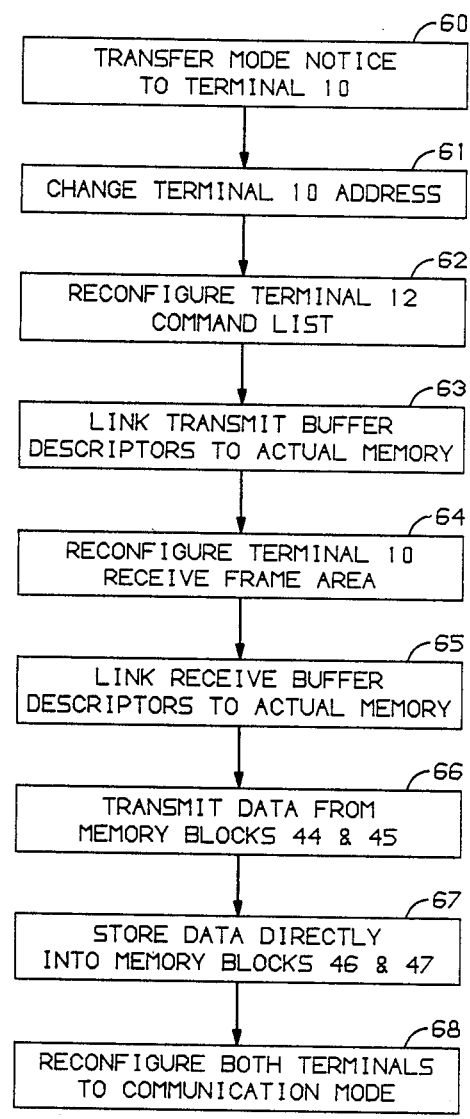
FIG. 1 is a flow diagram of a method embodying the present invention.
Figure 4:
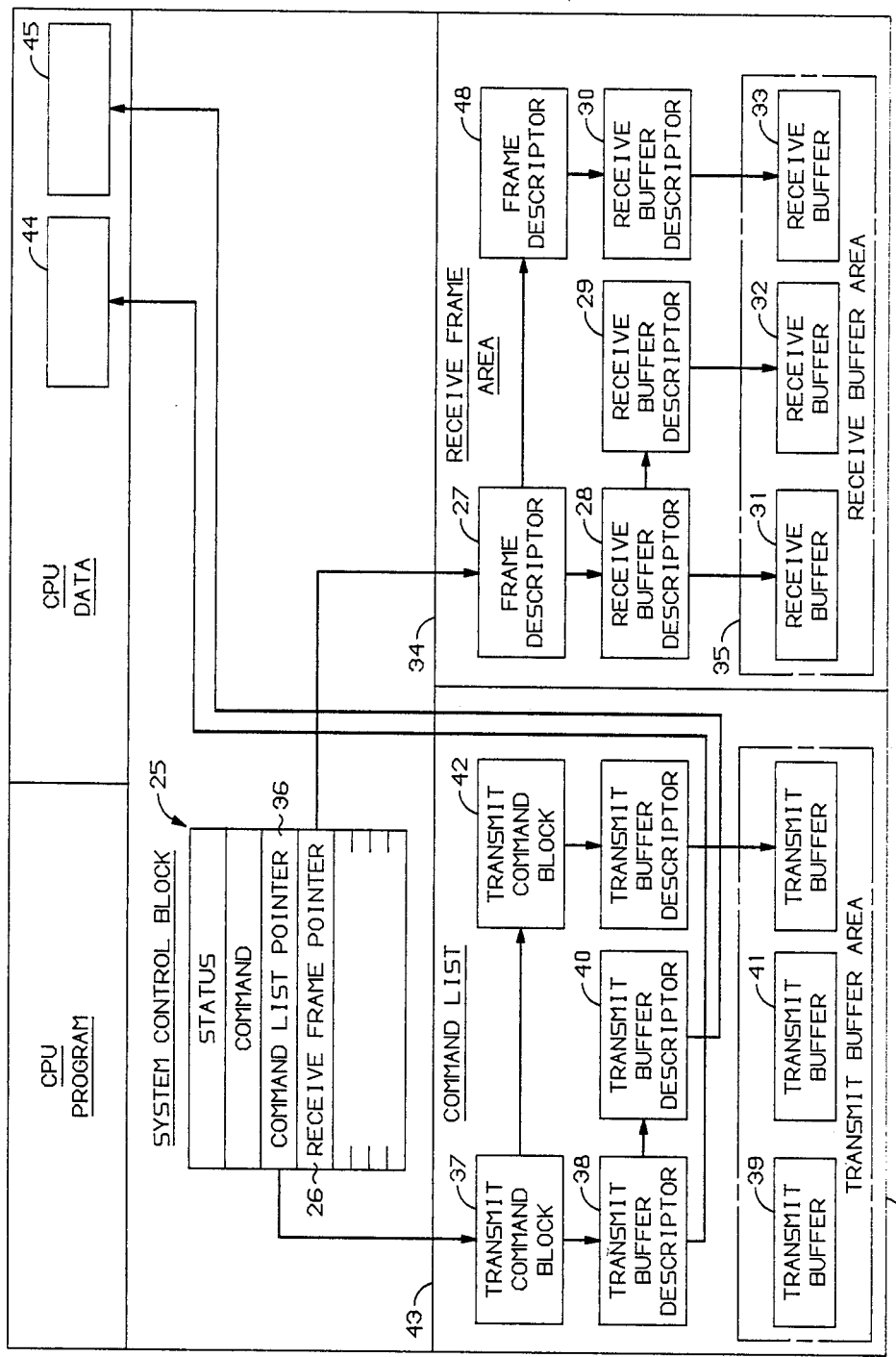
FIGS. 4 and 5 represent memory usage in the direct transfer mode of operation.
Figure 5:
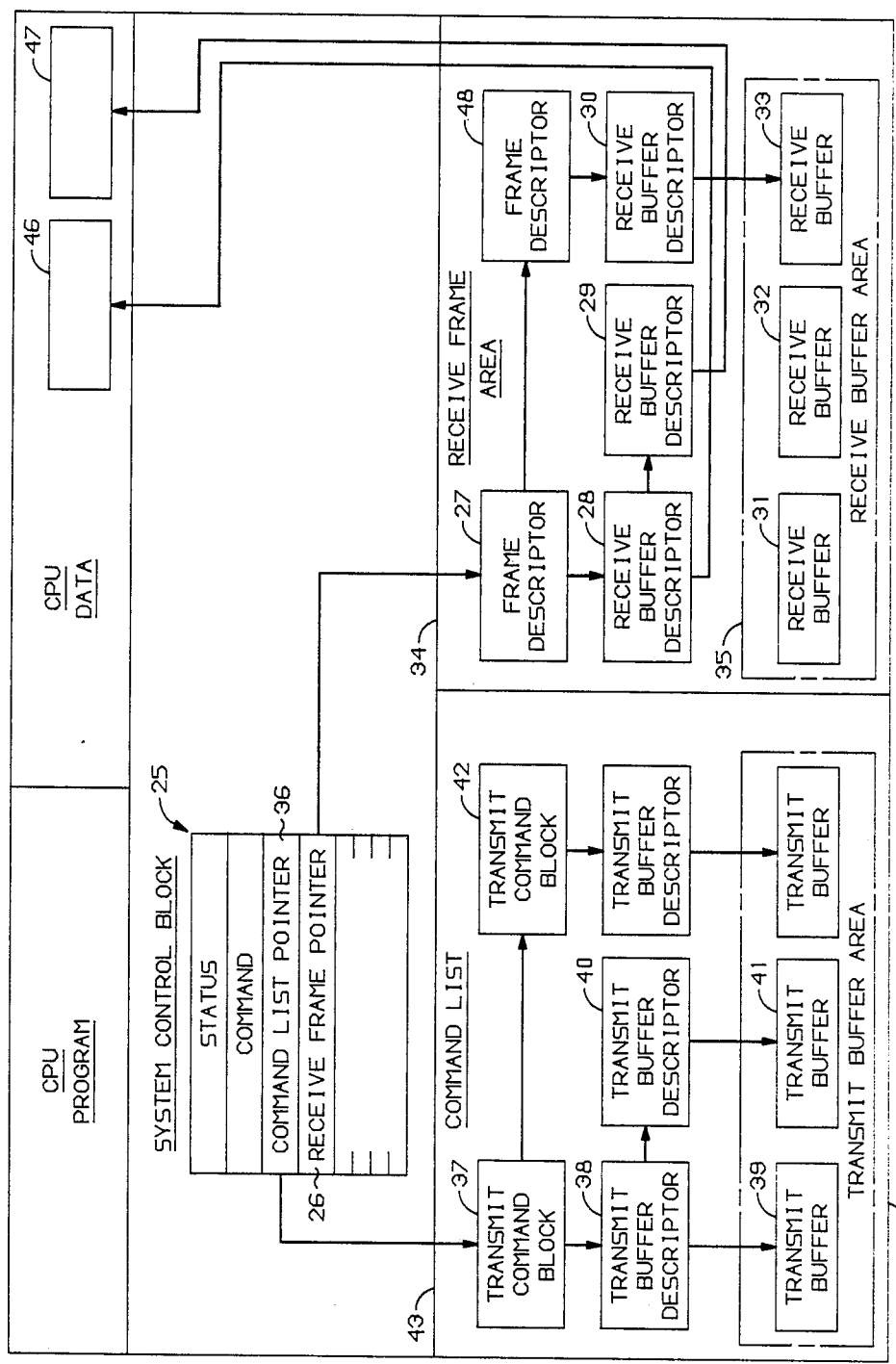

The following when read in conjunction with FIGS. 1, 4, and 5 is a description of the transmission, in the direct transfer mode, of a frame containing 32k bytes from memory 16 of terminal 12 to the memory 16 of terminal 10. FIG. 1 is a flow diagram of the procedure performed, FIG. 4 represents actions with regard to the sending terminal 12 and FIG. 5 represents actions with regard to the receiving terminal 10. Initially, terminal 11 transmits a control message to terminal 12 defining that a direct transfer from specified locations in memory 16 of sending terminal 12 to specified locations in memory 16 of receiving terminal 10 is to occur. Sending terminal 12 determines from the control message from terminal 11 which locations of memory 16 store data to be transferred and sends a message to the receiving terminal 10 indicating that a direct transfer mode transfer is about to begin (action block 60, FIG. 1). Such a message includes a type field defining that the data portion is to be used as a control message by CPU 18. This message also includes information specifying the number of frames to be transmitted, the number of bytes in each frame, and information defining where each frame is to be stored. When the CPU 18 of receiving terminal 10 reads a message from the receive buffers, it interprets the type field to determine what use to make of the received data. In the present example, the type field is interpreted and the received data is used by the CPU 18 as a control message. Such control messages may include any of the control commands executable by the co-processor 15. In response to the control message from sending terminal 12, CPU 18 in receiving terminal 10 changes the address of receiving terminal 10 to one used specifically for direct transfer mode data transfers (action block 61). This address change is performed to isolate receiving terminal 10 from receiving frames from any terminal except sending terminal 12 during the direct transfer procedure. In the present example, the new address is stored in a predetermined location in ROM 21 (FIG. 2) of terminal 12. It should be mentioned that other terminals can communicate on bus 13 using the communication mode while a pair of terminals are in the direct transfer mode. In the present example, information is stored in transmit command block 37 and the transmit buffer descriptors 38 and 40 of sending terminal 12 to enter the direct transfer mode. It should be mentioned that other transmit command blocks, e.g., 42, which store information defining the communication mode may be linked to transmit command block 37.

Sending terminal 12 reconfigures its command list 43 (action block 62) so that the actual storage areas of the data to be transmitted are pointed to instead of the transmit buffers. In the present example, receive buffer descriptors, e.g., 28, and transmit buffer descriptors, e.g., 37, can only handle data blocks of up to 16K bytes. Accordingly, CPU 18 treats the 32k bytes to be sent as two 16k byte blocks 44 and 45 (FIG. 4). The command list 43 is reconfigured by creating a transmit command block 37 containing the new address of the receiving terminal 10 and by linking transmit command block 37 to transmit buffer descriptor 38. Since the maximum data data block size is 16k bytes transmit buffer descriptor 38 is linked to transmit buffer descriptor 40 so that two 16k byte memory blocks can be used to construct a frame. A byte count of 16k is also stored in transmit buffer descriptors 38 and 40. Additionally, transmit buffer descriptor 38 is unlinked from transmit buffer 39 and linked (action block 63) to memory block 44 which is the actual storage location of the first 16k bytes of data to be transmitted. Similarly, transmit buffer descriptor 40 is unlinked from transmit buffer 41 and linked to memory block 45.

Receiving terminal 10 reconfigures (action block 64) its receive frame area 34 (FIG. 5) so that the actual memory locations where the data is to be stored are pointed to, instead of the receive buffers. The receive frame area is reconfigured by linking receive buffer descriptors 28 and 29 and changing the information stored therein. The new information indicates a buffer size of 16k bytes, links receive buffer descriptor 28 to memory block 46 and links receive buffer descriptor 29 to memory block 47 (action block 65). After the command list 43 of terminal 12 and the receive frame area 34 of terminal 10 have been reconfigured, the co-processor 15 of terminal 12 begins to transmit (action block 66) a frame addressed to the new address of terminal 10 which frame includes the 32k bytes of data from memory blocks 44 and 45. Co-processor 15 of terminal 10 recognizes the destination address of this frame as its own and stores the data directly into memory blocks 46 and 47 (action block 67) instead of its receive buffer area 34. After the frame is successfully stored in terminal 10, the links between receive buffer descriptors 28 and 29 and the memory blocks 46 and 47 are replaced with links to receive buffers, e.g., 31 and 32, in the receive buffer area and the buffer size variables are changed back to 64 bytes. Also, an acknowledgment signal is sent to the sending terminal 12. Sending terminal 12 responds to the acknowledgment signal by replacing the links from transmit buffer descriptors 38 and 40 to memory blocks 44 and 45 with links to transmit buffers 39 and 41 and changing the buffer size variable back to 64 bytes (action block 68). Using the techniques discussed above, frames of nearly any length can be constructed, transmitted and received. Additionally, multiple frames can be linked together by creating additional transmit command blocks in the command list 43 and additional frame descriptors in the receive frame area 34 of the receive terminal 10.

Figure 6:
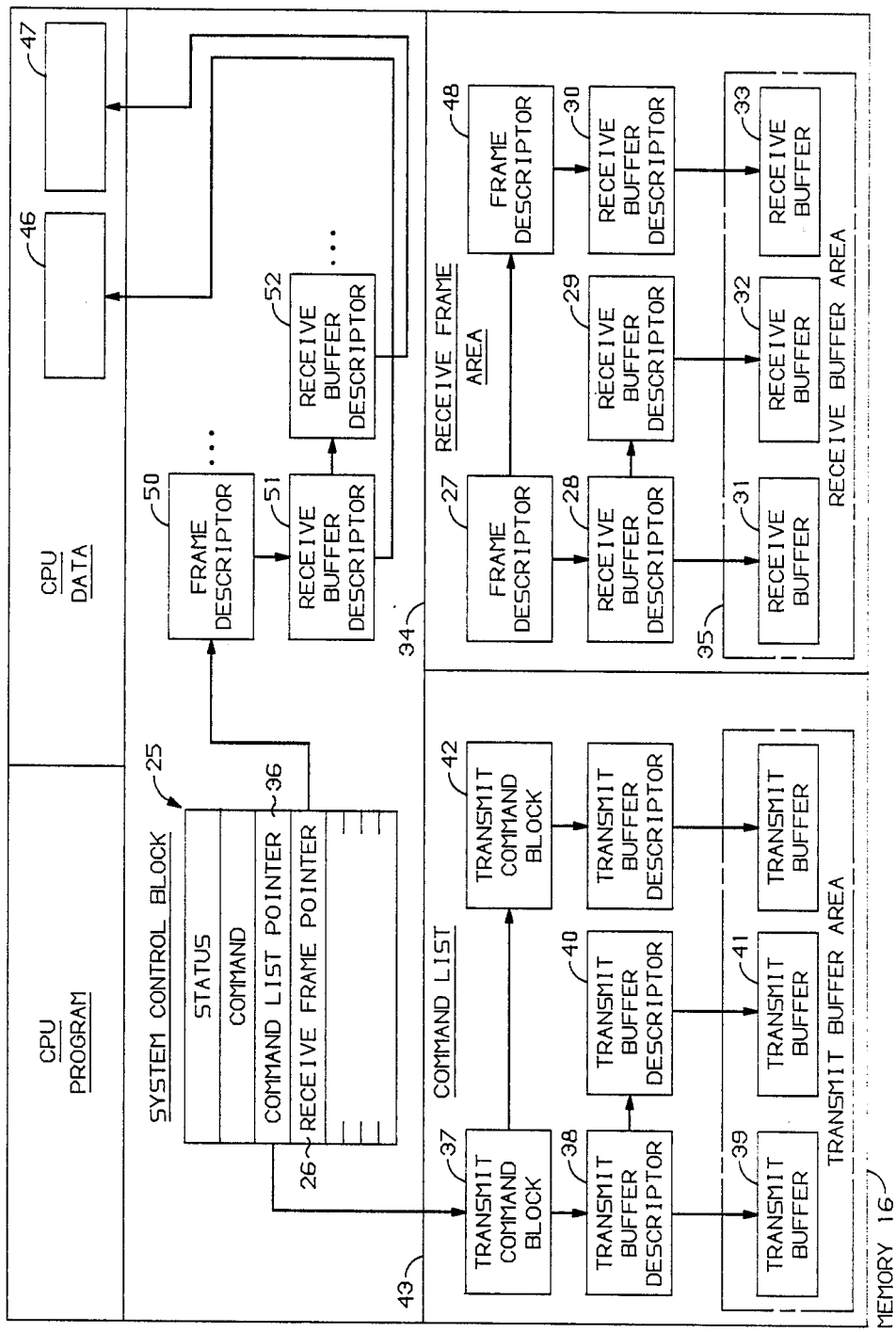
FIG. 6 is a representation of memory usage in an alternative direct transfer mode operation.

FIG. 6 is a representation of an alternative method of reconfiguring memory 16 in the receiving terminal 10 for the direct transfer mode. When terminal 10 is initialized, at least one additional frame descriptor 50 and receive buffer descriptors 51 and 52 are created. Receive buffer descriptors 51 and 52 include byte count values of 16K bytes. CPU 18 of terminal 10 in response to a request from terminal 12 for a 32K byte transfer to memory blocks 46 and 47 sets the receive frame pointer 26 to the address of frame descriptor 50 and sets the destination address in receive buffer descriptors 51 and 52 to point directly to memory blocks 46 and 47, respectively. The transfer occurs as above-described until the frame is completely received. After reception, the receive frame pointer 26 is changed to a value representing the prior frame descriptor 27.

What is claimed is:

1. In an arrangement comprising a first control unit for transmitting frames of data connected by a bus to a terminal comprising a second control unit, a co-processor, and a memory comprising a receive buffer area and a data and control area wherein the co-processor is set to receive frames of data from said bus and to store the frames of data so received in said receive buffer area and said second control unit reads received data from said receive buffer area for use by said second control unit, the method comprising:
   setting said co-processor to store received frames of data in particular locations in the data and control area of said memory, said particular locations being the actual locations where the data is to be stored;
   transmitting by said first control unit a frame of data to said terminal;
   storing by said co-processor said frame of data in said particular locations; and
   resetting said co-processor to store subsequent frames of data in said receive buffer area of said memory.

2. The method in accordance with claim 1 wherein received frames of data are stored in storage locations identified by a pointer stored in said memory and said setting step comprises:
   changing said pointer from a value identifying said receive buffer area to a value identifying said particular locations in said data and control area, and said resetting step comprises:
   changing said pointer from a value identifying said particular locations to a value identifying said receive buffer area.

3. The method in accordance with claim 1 wherein said method comprises
   transmitting by said first control unit before the performance of said setting step, set up information defining said particular locations; and 4. In an arrangement comprising a first terminal for transmitting data frames on a bus, said first terminal comprising a control unit, a co-processor, and a memory comprising a transmit buffer area and a data and control area wherein said control unit initiates the transmission of data by loading data into said transmit buffer area and setting said co-processor to transmit first data frames on said bus, said first data frames including data loaded into said transmit buffer area by said control unit, the method comprising:
   determining the actual locations in said data and control area of said memory storing data to be transmitted on said bus;
   setting said co-processor to transmit on said bus a second data frame including the data stored in said actual locations of said data and control area determined in the determining step;
   transmitting by said co-processor said second data frame comprising the data in said actual locations of said data and control area; and
   resetting said co-processor to transmit first data frames including data from said transmit buffer area.

5. The method in accordance with claim 4 wherein the storage location of data to be transmitted is identified by a pointer stored in said memory and said setting step comprises:
   changing said pointer from a value identifying said transmit buffer area to a value identifying said actual locations in said data and control area, and said resetting step comprises:
   changing said pointer from a value identifying said actual locations to a value identifying said transmit buffer area.

6. In an arrangement comprising at least three terminals connected to a bus for transmitting and receiving frames of data, a first of said terminals comprising a control unit, a co-processor, and a memory comprising a receive buffer area and a data and control area wherein the co-processor receives frames of data from said bus and stores the frames of data so received in said receive buffer area and said control unit reads received data from said receive buffer area for use by said control unit, the method of transmitting a frame of data from a second of said terminals to said first terminal comprising:
   isolating said first terminal from receiving frames of data from any of said terminals except said second terminal;
   setting said co-processor to store received frames of data in particular locations in the data and control area of said memory, said particular locations being the actual locations where the data is to be stored;
   transmitting by said second terminal a frame of data to said first terminal via said bus;
   storing said frame of data in said particular locations; and
   resetting said co-processor to store subsequent frames of data in said receive buffer area of said memory.

7. The method in accordance with claim 6 wherein each terminal has an address and a given terminal receives frames of data from said bus which frames of data comprise the address of the given terminal and said isolating step comprises:

changing the address of said first terminal to a predetermined address to which only said second terminal is to transmit and said transmitting step comprises transmitting on said bus a frame of data comprising said predetermined address.

8. In an arrangement comprising a first terminal comprising a first control unit, a first co-processor, and a first memory comprising a data and control area and a receive buffer area identified by a first pointer; a second terminal comprising a second control unit, a second co-processor, and a second memory comprising a data and control area and a transmit buffer area identified by a second pointer; and a communication bus connecting said first and said second terminals wherein said transmit buffer area stores information to be transmitted on said communication bus and said receive buffer area stores information received from said communication bus, the method comprising:

changing said second pointer to a third pointer identifying storage locations in the data and control area of said second memory, which storage locations contain data to be transmitted to said first terminal;

changing said first pointer to a fourth pointer identifying storage locations in the data and control area of said first memory where data is to be stored;

transmitting by said second co-processor the data stored in the locations identified by said third pointer on said bus; and storing by said first co-processor in the locations identified by said fourth pointer data transmitted on said bus.

9. The method in accordance with claim 8 further comprising changing said third pointer back to said second pointer upon completion of said storing step and changing said fourth pointer to said first pointer upon completion of said storing step.

10. The method in accordance with claim 8 wherein said first memory stores a receive frame pointer at a predetermined location and said first co-processor uses said receive frame pointer to identify the storage location of said first pointer, said step of changing said first pointer comprising:

changing said receive frame pointer to a value identifying the storage location of said fourth pointer.

* * * * *

UNITED STATES PATENT AND TRADEMARK OFFICE
CERTIFICATE OF CORRECTION

PATENT NO. : 4,727,538

DATED : February 23, 1988

INVENTOR(S) : David G. Furchtgott, Thomas L. Hiller and Frederick H. Keeve, Jr.

It is certified that error appears in the above-identified patent and that said Letters Patent is hereby corrected as shown below:

IN THE CLAIMS

Column 8, before line 9, insert "receiving said setup information by said terminal."

Signed and Sealed this

Twelfth Day of November, 1991

Attest:

HARRY F. MANBECK, JR.

*Attesting Officer*     *Commissioner of Patents and Trademarks*